United States Patent [19]
Nakanishi et al.

[11] Patent Number: 5,844,175
[45] Date of Patent: Dec. 1, 1998

[54] ANALOG-TYPE TRANSPARENT TOUCH PANEL WITH IMPROVED ELECTRODE ARRANGEMENT AND SIMPLIFIED METHOD FOR PRODUCING THE SAME

[75] Inventors: Akira Nakanishi, Hirakata; Toshiharu Fukui, Nara; Tetsuo Murakami, Hirakata, all of Japan

[73] Assignee: Matsushita Electric Industrial Co., Ltd., Kadoma, Japan

[21] Appl. No.: 622,660

[22] Filed: Mar. 26, 1996

[51] Int. Cl.⁶ .............................. G08C 21/00; G09G 5/00
[52] U.S. Cl. ................... 178/18.03; 178/18.01; 345/173; 345/174
[58] Field of Search ................... 345/173, 174, 345/180, 182, 205, 206; 178/18.01, 18.03, 18.07

[56] References Cited

U.S. PATENT DOCUMENTS

| | | | |
|---|---|---|---|
| 4,745,240 | 5/1988 | Furukawa et al. ...................... | 178/18 |
| 5,007,085 | 4/1991 | Greanias et al. ........................ | 345/180 |
| 5,151,688 | 9/1992 | Tanaka et al. .......................... | 345/182 |
| 5,181,030 | 1/1993 | Itaya et al. .............................. | 178/18 |
| 5,220,136 | 6/1993 | Kent ........................................ | 178/18 |

*Primary Examiner*—Vijay Shankar
*Attorney, Agent, or Firm*—Renner, Otto, Boisselle & Sklar

[57] ABSTRACT

An analog-type transparent touch panel includes a first substrate; a second substrate located opposed to the first substrate with a space interposed therebetween; a first transparent conductive film provided on the first substrate to be opposed to the second substrate; a second transparent conductive film provided on the second substrate to be opposed to the first substrate; a pair of first electrodes for generating a potential difference in a plane of the first transparent conductive film; and a pair of second electrodes for generating a potential difference in a plane of the second transparent conductive film. The pair of first electrodes are formed on the second substrate.

19 Claims, 7 Drawing Sheets

FIG. 8 PRIOR ART

ANALOG-TYPE TRANSPARENT TOUCH PANEL WITH IMPROVED ELECTRODE ARRANGEMENT AND SIMPLIFIED METHOD FOR PRODUCING THE SAME

BACKGROUND OF THE INVENTION

1. Field of the Invention

The present invention relates to an analog-type transparent touch panel attached to a display device, such as a liquid crystal display device, which allows the user to input data in accordance with the display on the screen by using a finger or a pen, and a method for producing the same.

2. Description of the Related Art

Transparent touch panels for use in electronic devices have been put into practice in various systems using, for example, a resistive film, a capacitance, and ultrasound. The present invention relates to one of the resistive film-type transparent touch panels.

A conventional resistive film-type transparent touch panel includes two substrates each having a transparent conductive film. The two substrates are opposed to each other with a dot spacer interposed therebetween. By pressing the panel by a finger, a pen or the like, the two transparent conductive films are put into contact with each other. The position at which the transparent conductive film provided on one substrate and the transparent conductive film provided on another substrate contact each other is detected by measuring a partial voltage of a voltage applied to the one substrate and a partial voltage of a voltage applied to the another substrate. These partial voltages correspond to the contact position.

Figure 7:
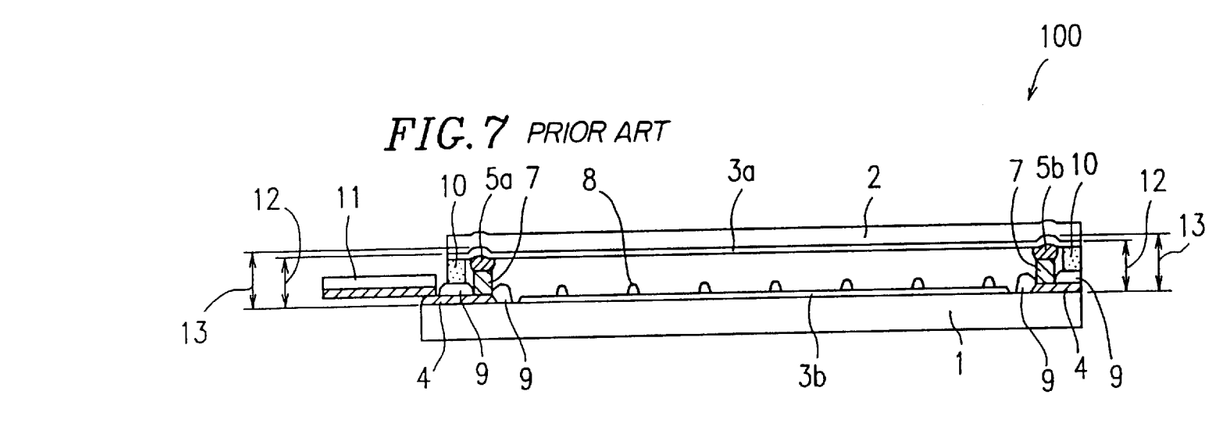
FIG. 7 shows a cross sectional view of a conventional analog-type transparent touch panel.

With reference to FIG. 7, such a conventional analog-type transparent touch panel 100 will be described. As is shown in FIG. 7, the touch panel 100 includes a lower substrate 1. On the lower substrate 1, a transparent conductive film 3b, power supply electrodes (not shown) and take-out electrodes 4 are provided. An insulative resist layer 9 is applied on a peripheral area of the lower substrate 1, so as to cover the take-out electrodes 4.

The power supply electrodes are respectively provided along two opposite sides of the transparent conductive film 3b, for uniformly distributing a voltage therein to generate a potential difference in the plane of the transparent conductive film 3b.

The touch panel 100 further includes an upper substrate 2 which is to be pressed by a finger or a pen. On the upper substrate 2, a transparent conductive film 3a and two power supply electrodes 5a and 5b are provided. The power supply electrodes 5a and 5b are respectively provided along two opposite sides of the transparent conductive film 3a for uniformly distributing a voltage in the transparent conductive film 3a to generate a potential difference in the plane of the transparent conductive film 3a.

The power supply electrodes 5a and 5b are electrically connected to the take-out electrodes 4 via connecting electrodes 7, and the take-out electrodes 4 are connected to an external device by a flexible pattern 11 or the like. The upper substrate 2 and lower substrate 1 are combined together along outer peripheries thereof by an adhesive layer 10. The upper substrate 2 and lower substrate 1 can also be combined together by an adhesive tape.

Figure 8:
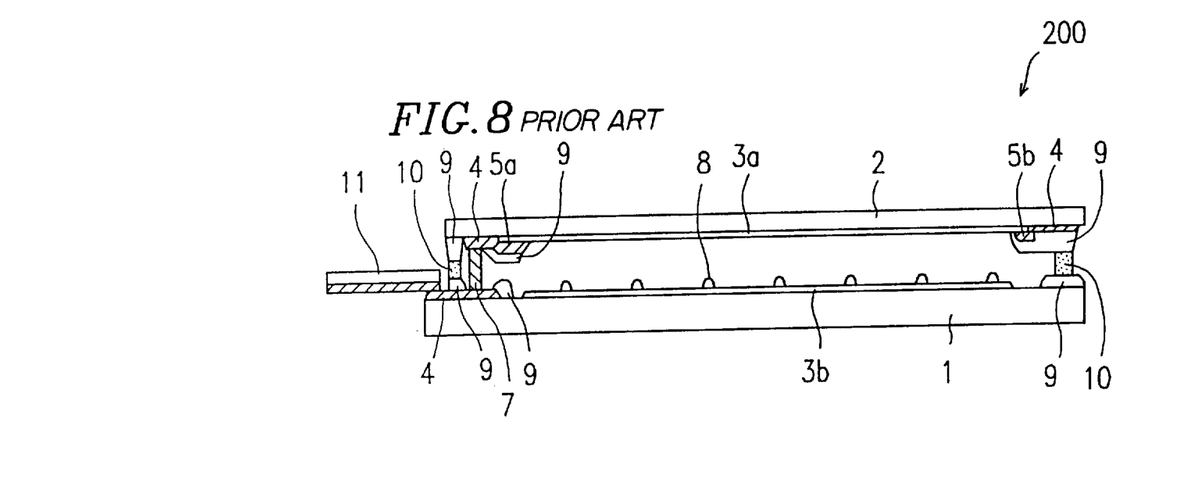
FIG. 8 shows a cross sectional view of another conventional analog-type transparent touch panel.

FIG. 8 shows another conventional analog-type transparent touch panel 200. The touch panel 200 is different from the touch panel 100 in that the upper substrate 2 and lower substrate 1 both have the take-out electrodes 4. Thus, an insulative resist layer 9 is formed on both of the upper substrate 2 and lower substrate 1 for covering the take-out electrodes 4 formed on both of the upper substrate 2 and lower substrate 1, respectively.

The conventional analog-type transparent touch panels described above have the following problems:

(1) In the case of the touch panel 200, the power supply electrodes, the take-out electrodes 4 and the insulative resist layer 9 need to be provided on both of the upper substrate 2 and lower substrate 1. Accordingly, the number of formation steps of the analog-type transparent touch panel increases, and thus the production cost is raised.

(2) The upper substrate 2 can be formed of PET (polyethylene terephthalate) or the like with the transparent conductive film 3a formed thereon by sputtering or the like. In such a case, guide holes and other marks so for positioning the power supply electrodes 5a and 5b and the like need to be provided in a peripheral area of the transparent conductive film 3a on the upper substrate 2. The upper substrate 2, and thus the expensive transparent conductive film 3a, need to be enlarged so as to have a sufficient area for the holes and the marks, which increases the production cost.

(3) In the case where the lower substrate 1 is formed of glass and the upper substrate 2 is formed of a different material such as PET, the power supply electrodes provided on the upper substrate 2 need to be formed in a different manner from the power supply electrodes on the lower substrate 1 since an appropriate formation method needs to be used for each of the substrates. Accordingly, different equipment, space and jigs are required for different methods, which raises the production cost.

(4) As the number of formation stops of the analog-type transparent touch panel increases, the transparent conductive films 3a and 3b, which are thin films, are more exposed to foreign objects and substances such as a printing board, various equipment, and hands of the operators. Thus, the percentage of quality defect increases.

SUMMARY OF THE INVENTION

According to the present invention, an analog-type transparent touch panel is provided. The analog-type transparent touch panel includes: a first substrate; a second substrate located opposed to the first substrate with a space interposed therebetween; a first transparent conductive film provided on the first substrate to be opposed to the second substrate; a second transparent conductive film provided on the second substrate to be opposed to the first substrate; a pair of first electrodes for generating a potential difference in a plane of the first transparent conductive film; and a pair of second electrodes for generating a potential difference in a plane of the second transparent conductive film. In the analog-type transparent touch panel, the pair of first electrodes are formed on the second substrate.

According to another aspect of the present invention, a method for producing an analog-type transparent touch panel is provided. The analog-type transparent touch panel includes: a first substrate; a second substrate located opposed to the first substrate with a space interposed therebetween; a first transparent conductive film provided on the first substrate to be opposed to the second substrate; a second transparent conductive film provided on the second substrate to be opposed to the first substrate; a pair of first electrodes for generating a potential difference in a plane of the first transparent conductive film; and a pair of second electrodes for generating a potential difference in a plane of the second transparent conductive film. The method for producing the analog-type transparent touch panel includes the step of forming the pair of first electrodes and the pair of second electrodes on the second substrate.

Thus, the invention described herein makes possible the advantages of providing an analog-type transparent touch panel having a higher quality and produced at lower cost.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

Figure 1A:
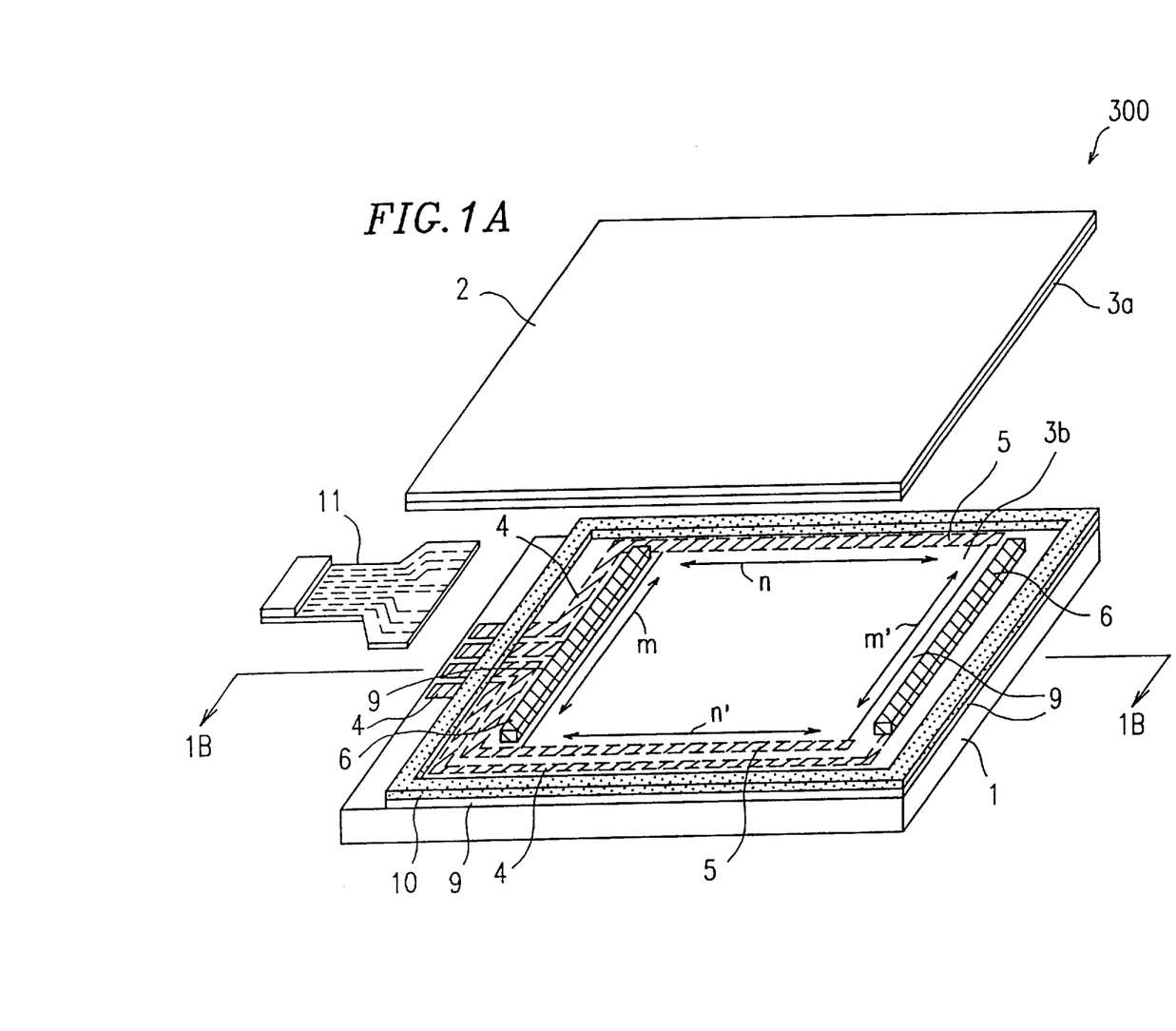
FIG. 1A shows an exploded isometric view of an analog-type transparent touch panel in an example according to the present invention.
Figure 1B:
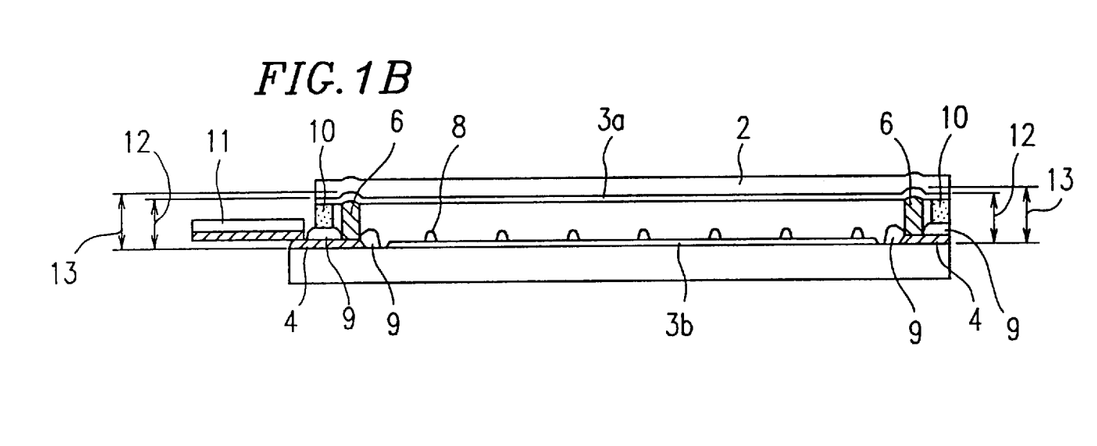
FIG. 1B shows a cross sectional view of the analog-type transparent touch panel shown in FIG. 1A taken along lines 1B—1B in FIG. 1A.

An analog-type transparent touch panel in an example according to the present invention will be described with reference to FIGS. 1A and 1B. FIG. 1A shows an exploded isometric view of an analog-type transparent touch panel 300 in an example according to the present invention; and FIG. 1B shows a cross sectional view of the transparent touch panel 300 taken along lines 1B—1B in FIG. 1A. The identical elements with those of the conventional panels bear the identical reference numerals.

As is shown in FIGS. 1A and 1B, the analog-type transparent touch panel 300 includes an upper substrate 2, a lower substrate 1, transparent conductive films 3a and 3b respectively provided on the upper substrate 2 and lower substrate 1, take-out electrodes 4, and power supply electrodes 5.

The upper substrate 2 and lower substrate 1 are opposed to each other with dot spacers 8 (FIG. 1B) interposed therebetween. The transparent conductive films 3a and 3b are quadrangles having four substantially 90° angles. The take-out electrodes 4 and the power supply electrodes 5 are provided on the lower substrate 1, and the take-out electrodes 4 are mostly covered with an insulative resist layer 9.

The transparent conductive films 3a provided on the upper substrate 2 is electrically connected to the take-out electrodes 4 provided on the lower substrate 1 via a pair of connecting electrodes 6 (height: 80 to 100 μm; length: 100 mm; width: 2 mm) provided on the lower substrate 1. In detail, the pair of connecting electrodes 6 are located along two opposite sides of the transparent conductive film 3b parallel to lines m and m'. The power supply electrodes 5 are located along two opposite sides of the transparent conductive film 3b parallel to lines n and n' and perpendicular to lines m and m'.

The pair of connecting electrodes 6 also act as power supply electrodes for the upper substrate 2. As is shown in FIG. 1B, a top portion of each of the pair of connecting electrodes 6 is in contact with the transparent conductive film 3a on the upper substrate 2, and a bottom portion of each of the pair of connecting electrodes 6 is in contact with the take-out electrodes 4 on the lower substrate 1 through an exposed area (not shown) of the take-out electrodes 4 along lines m and m' which is not covered with the insulative resist layer 9.

Alternatively, the pair of connecting electrodes 6 can be electrically connected to the transparent conductive film 3a via a conductive metal film formed of gold, copper or the like provided in a peripheral area of the transparent conductive film 3a.

The pair of power supply electrodes 5 are electrically connected to the transparent conductive film 3b.

The upper substrate 2 and lower substrate 1 are combined together by an adhesive layer 10 provided along outer peripheries of the upper substrate 2 and the lower substrate 1 as shown in FIG. 1A.

The analog-type transparent touch panel 300 having the above-described structure is used in the following manner. A force is applied to the upper substrate 2 with, for example, a finger or a pen. Thus, the transparent conductive film 3a provided on the upper substrate 2 is put into contact with the transparent conductive film 3b provided on the lower substrates 1.

The position at which the transparent conductive film 3a provided on the upper substrate 2 and the transparent conductive film 2b provided on the lower substrates 1 contact each other is detected by measuring a partial voltage of a voltage applied to the upper substrate 2 and a partial voltage of a voltage applied to the lower substrate 1. These partial voltages correspond to the contact position.

The lower substrate 1 has a thickness of about 0.1 to about 3 mm and can be formed of glass, a polymer such as PET, or a transparent polymer such as polycarbonate or an acrylic resin.

The upper substrate 2 which is to be pressed by a finger or a pen has a thickness of about 0.1 to about 0.5 mm and can be formed of glass, a polymer such as PET, or a transparent polymer such as polycarbonate or an acrylic resin.

The transparent conductive films 3a and 3b are formed of a thin film mainly containing indium oxide or tin oxide. The take-out electrodes 4 and the power supply electrodes 5 are formed of a material mainly containing Ag, Cu or the like. The insulative resist layer 9 is formed of a material mainly containing an epoxy resin, a phenol resin, a resin containing polyester, glass or the like.

The connecting electrodes 6 are formed of an isotropic conductive adhesive mainly containing Ag, Cu or the like, and has a volumetric resistivity of about $1 \times 10^{-2} \Omega \cdot cm$ or less.

The adhesive layer 10 is formed of an acrylic adhesive, an acrylic resin, or a two-sided adhesive tape which is patterned in advance.

As is described above, the transparent touch panel 300 has all the electrodes except for the transparent conductive film 3a on the lower substrate 1, and is electrically connected to an external device via a flexible pattern 11.

Figure 2:
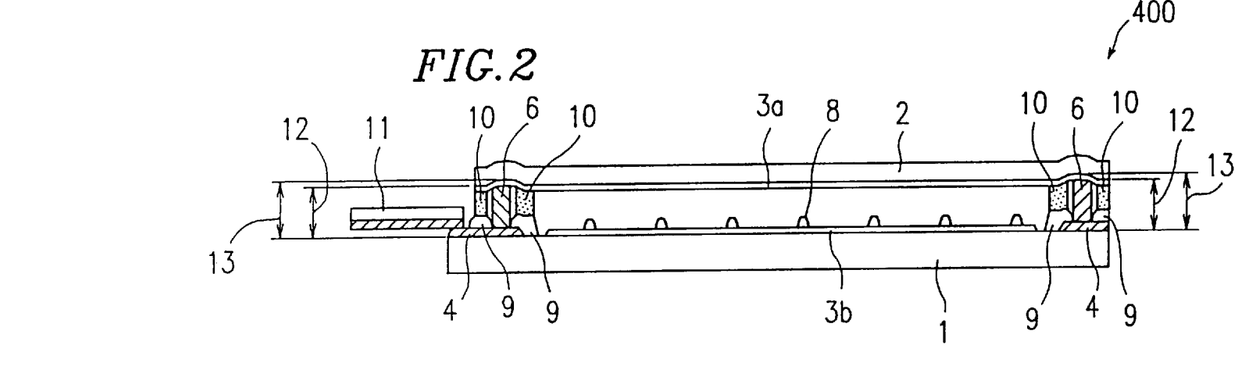
FIG. 2 shows a cross sectional view of an analog-type transparent touch panel in another example according to the present invention.

FIG. 2 shows a cross sectional view of an analog-type transparent touch panel 400 in another example according to the present invention. The touch panel 400 is different from the touch panel 300 in that two adhesive layers 10 are provided respectively inside and outside each of the pair of connecting electrodes 6.

Due to such a structure shown in FIG. 2, the mechanical load which is applied to the connecting electrodes 6 under a high-temperature, high-humidity environment or by a drastic temperature change can be alleviated, thus improving the reliability of the transparent touch panel.

In the analog-type transparent touch panels 300 and 400, a gap 13 between the upper substrate 2 and the lower substrate 1 in the areas where the connecting electrodes 6 are located can be equal to or greater than a gap 12 between the upper substrate 2 and the lower substrate 1 in the area where the adhesive layer 10 is located. By such a structure, the mechanical load which is applied to the pair of connecting electrodes 6 under a high-temperature, high-humidity environment or by a drastic temperature change can be alleviated, thus improving the reliability of the transparent touch panel.

In the analog-type transparent touch panels 300 and 400, the transparent conductive film 3a is formed over the entire surface of the upper substrate 2 without being patterned. Accordingly, large-scale etching equipment used for patterning is not necessary. Thus, a process for conserving environment, for example, handling waste fluid can be eliminated. Further, the number of production steps of the touch panel is reduced. For these reasons, the touch panel can be produced at lower cost.

Figure 3:
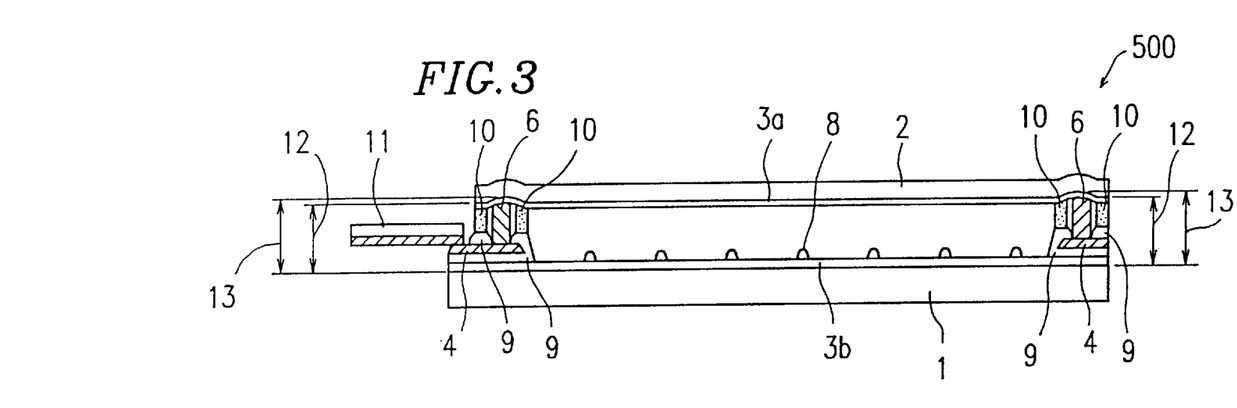
FIG. 3 shows a cross sectional view of an analog-type transparent touch panel in still another example according to the present invention.

FIG. 3 shows a cross sectional view of an analog-type transparent touch panel 500 in still another example according to the present invention. In the touch panel 500, the transparent conductive film 3b on the lower substrate 1 is also formed over the entire surface thereof without being patterned. The insulative resist layer 9 is provided between the transparent conductive film 3b and the take-out electrodes 4 as well as on the take-out electrodes 4.

Due to such a structure shown in FIG. 3, the cost for the large-scale etching equipment used for patterning the transparent conductive film 3b and the cost of environment conservation are further lowered, and the number of production steps of the touch panel is further reduced. Thus, the production cost of the touch panel can be further reduced.

Hereinafter, practical methods for producing a transparent touch panels according to the present invention will be described.

FIGS. 4A through 4H show cross sectional views illustrating a method for producing the analog-type transparent touch panel 300 shown in FIGS. 1A and 1B.

Figure 4A:
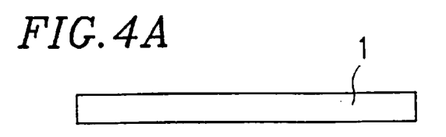
FIGS. 4A through 4H show cross sectional views illustrating a method for producing the analog-type transparent touch panel shown in FIGS. 1A and 1B.
Figure 4B:
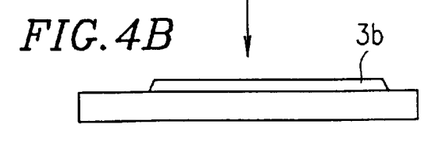

First, on a surface of the lower substrate 1 formed of glass as shown in FIG. 4A, a transparent conductive film formed of a material mainly containing indium oxide or tin oxide is formed by sputtering and patterned by etching to form the transparent conductive film 3b as shown in FIG. 4B. Alternatively, ink mainly containing an organic indium compound or an organic tin compound is printed on the lower substrate 1 and baked to form the transparent conductive film 3b.

Figure 4C:
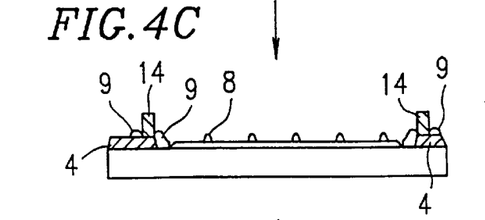

Next, as is shown in FIG. 4C, ink mainly containing Ag for the take-out electrodes 4 and the power supply electrodes, ink for the dot spacers 8, and an insulative resist ink are printed on the lower substrate 1 and dried. As a result, the take-out electrodes 4, the power supply electrodes (not shown), the dot spacers 8, and the insulative resist layer 9 are formed. Then, Ag ink mainly containing a disc-shaped Ag powder and a hot-melt (or thermosetting) polyester is screen-printed to form a conductive film 14 acting as a connecting electrode.

Figure 4D:
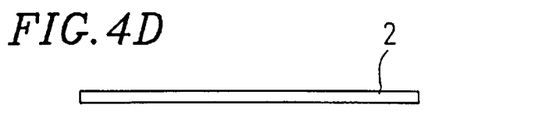
Figure 4E:
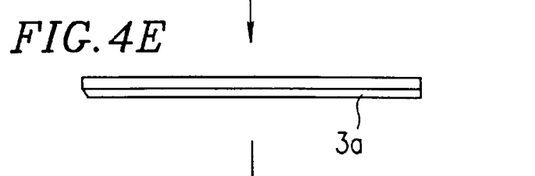

Over the entire surface of the upper substrate 2 formed of PET as shown in FIG. 4D, the transparent conductive film 3a is formed by sputtering without patterning as shown in FIG. 4E.

Figure 4F:
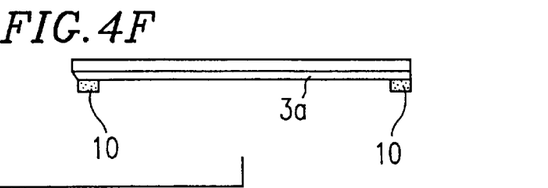

Next, as is shown in FIG. 4F, a two-sided adhesive tape patterned to be the adhesive layer 10 is applied on the transparent conductive film 3a.

Figure 4G:
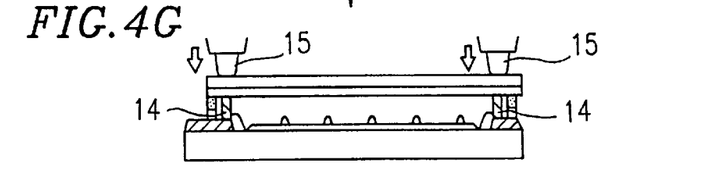
Figure 4H:
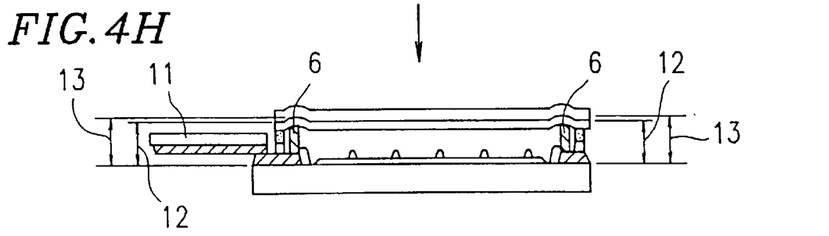

As is shown in FIG. 4G, the upper substrate 2 and the lower substrate 1 having the above-described elements thereon are combined together so that the transparent conductive films 3a and 3b are opposed to each other. The upper electrode 2 is pressed downward at a pressure of about 5 kg/cm$^2$ while heating the conductive film 14 by a pressing member 15 formed of silicone rubber heated to about 150° C. Thus, the pair of connecting electrodes 6 for supplying power to the transparent conductive films 3a formed on the upper substrate 2, and also for connecting the transparent conductive films 3a and the take-out electrodes 4 formed on the lower substrate 1, are formed as shown in FIG. 4H. The resultant pair of connecting electrodes 6 each have a volumetric resistivity of about $1 \times 10^{-2} \Omega \cdot cm$.

Preferably, the gap 13 between the upper substrate 2 and lower substrate 1 in the areas where the connecting electrodes 6 are located is greater than the gap 12 between the upper substrate 2 and lower substrate 1 in the area where the adhesive layer 10 is located. This is realized in the following manner.

As the Ag ink for the conductive film 14 to be formed into the pair of connecting electrodes 6, a material, for example a resin, which has a higher glass transition point than that of the material for the adhesive layer 10 is used. In addition, the Ag ink contains metal powder at a ratio of 70 wt. % or more. Due to the conductive film 14 having a higher glass transition point than that of the material for the adhesive layer 10, the conductive film 14 is deformed and flows less than the adhesive layer 10 during the heating and pressurizing. The metal powder contained in the Ag ink in the ratio of 70 wt.% or more further restricts the deformation and flow during the heating and pressurizing.

Figure 5A:
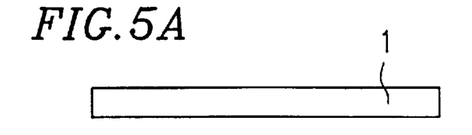
FIGS. 5A through 5G show cross sectional views illustrating a method for producing the analog-type transparent touch panel shown in FIG. 2.
Figure 5B:
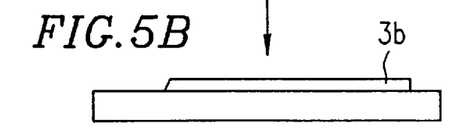
Figure 5C:
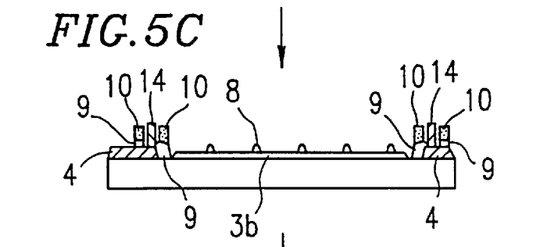

FIGS. 5A through 5C show cross sectional views illustrating a method for producing the analog-type transparent touch panel 400 shown in FIG. 2.

First, on a surface of the lower substrate 1 formed of glass shown in FIG. 5A, a transparent conductive film formed of a material mainly containing indium oxide or tin oxide is formed by sputtering and patterned by etching to form the transparent conductive film 3b shown in FIG. 5B. Alternatively, ink mainly containing an organic indium compound or an organic tin compound is printed on the lower substrate 1 and baked to form the transparent conductive film 3b.

Still alternatively, although not shown, the transparent conductive film 3b is formed over the entire surface of the lower substrate 1 by sputtering, and then the insulative resist layer 9 is printed to insulate the transparent conductive film 3b from the take-out electrodes 4 which is formed thereon. Such a structure corresponds to the analog-type transparent touch panel 500 shown in FIG. 3.

Next, as is shown in FIG. 5C, ink mainly containing Ag for the take-out electrodes 4 and the power supply electrodes, ink for the dot spacers 8, and an insulative resist ink are printed on the lower substrate 1 and dried. As a result, the take-out electrodes 4, the power supply electrodes (not shown), the dot spacers 8, and the insulative resist layer 9 are formed. Then, Ag ink mainly containing a disc-shaped Ag powder and a hot-melt (or thermosetting) polyester is screen-printed to form a conductive film 14 acting as a connecting electrode.

Since the conductive film 14 is tack-free when being dried, ink for further elements can be easily printed on the lower substrate 1 in the vicinity of the conductive film 14. Utilizing such a property of the conductive film 14, acrylic adhesive ink is printed on the lower substrate 1 to form the adhesive layers 10 inside and outside the conductive film 14.

Figure 5D:
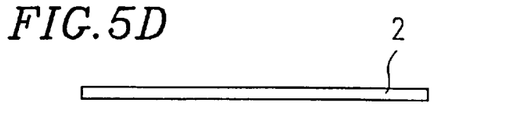
Figure 5E:
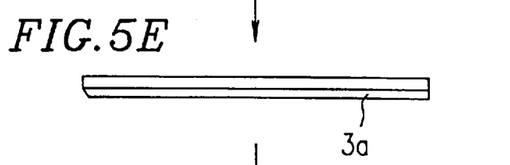

Over the entire surface of the upper substrate 2 formed of PET shown in FIG. 5D, the transparent conductive film 3a is formed by sputtering without patterning, as shown in FIG. 5E.

Figure 5F:
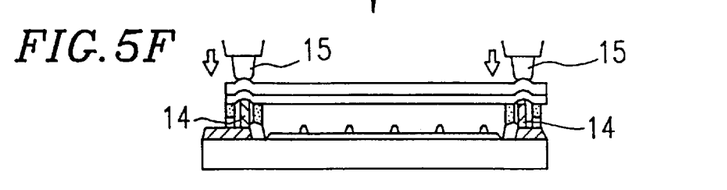
Figure 5G:
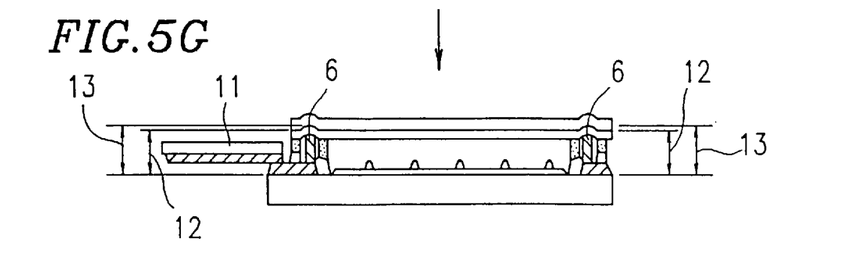

As is shown in FIG. 5F, the upper substrate 2 and the lower substrate 1 having the above-described elements thereon are combined together so that the transparent conductive films 3a and 3b are opposed to each other. The upper substrate 2 is pressed downward at a pressure of about 5 kg/cm$^2$ while heating the conductive film 14 by a pressing member 15 formed of silicone rubber heated to about 150° C. Thus, the connecting electrodes 6 for supplying power to the transparent conductive films 3a formed on the upper substrate 2, and also for connecting the transparent conductive films 3a and the take-out electrodes 4 formed on the lower substrate 1, are formed as shown in FIG. 5G. The resultant pair of connecting electrodes 6 each have a volumetric resistivity of about $1 \times 10^{-2}$ Ω·cm.

Analog-type transparent touch panels according to the present invention and analog-type transparent touch panels produced as comparative examples are compared in performance.

pair of connecting electrodes 6. The gap 13 between the upper substrate 2 and the lower substrate 1 in the areas where the pair of connecting electrodes 6 are formed is 70 μm. The gap 12 between the upper substrate 2 and the lower substrate 1 in the area where the adhesive layer 10 is formed is 80 μm.

The analog-type transparent touch panel B has the adhesive layers 10 formed inside and outside each of the pair of connecting electrodes 6. The gap 13 is 100 μm and the gap 12 is 80 μm.

The analog-type transparent touch panel C has the similar structures to that of the analog-type transparent touch panel B, but is made in a traditional method.

The analog-type transparent touch panel D has the similar structure to that of the analog-type transparent touch panel 400 shown in FIG. 2 but uses an anisotropic conductive film for the pair of connecting electrodes 6.

The analog-type transparent touch panel E is produced in accordance with the present invention but uses the pair of connecting electrodes 6 having a volumetric resistivity of $1 \times 10^{-1}$ Ω·cm. Such a volumetric resistivity is larger than $1 \times 10^{-2}$ Ω·cm, which is the volumetric resistivity of the transparent touch panels according to the present invention.

The analog-type transparent touch panels C, D and E have the adhesive layers 10 inside and outside the connecting electrodes 6. In analog-type transparent touch panels C and E, the gap 13 is 100 μm and the gap 12 is 80 μm. In the analog-type transparent touch panel D, the gap 13 is as small as 50 μm due to the thinness of the is anisotropic conductive film which is used as the connecting electrodes 6, whereas the gap 12 is 80 μm.

Figure 6:
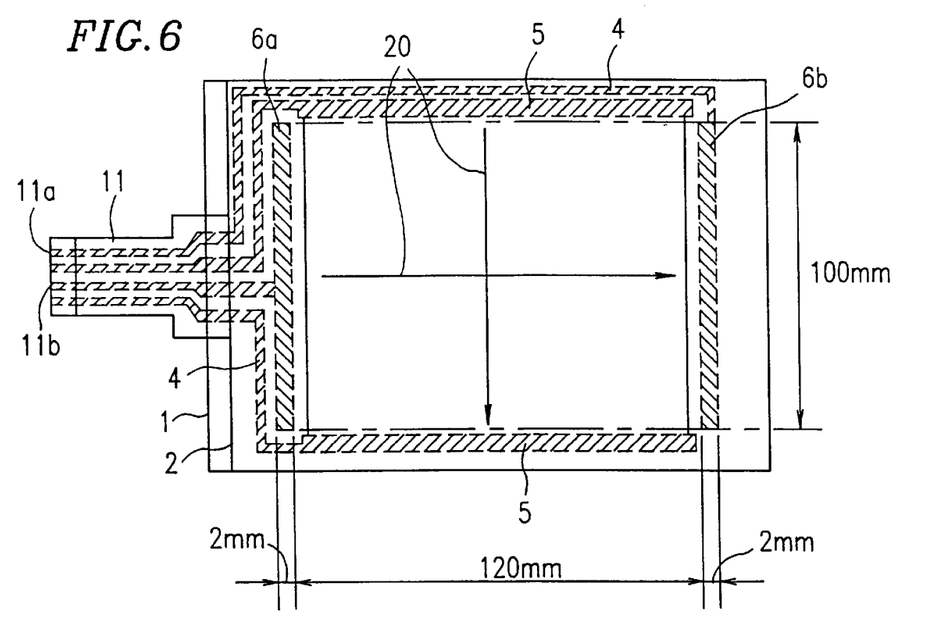
FIG. 6 shows a top view of a lower substrate of each of analog-type transparent touch panels according to the present invention and analog-type transparent touch panels used for comparison test.

The lower substrate of each of the analog-type transparent touch panels A through E has a top view as shown in FIG. 6. In FIG. 6, the pair of connecting electrodes 6 are indicated as electrodes 6a and 6b, and the flexible pattern 11 includes electrodes 11a and 11b respectively connected to the electrodes 6a and 6b.

Linearity of an analog-type transparent touch panel is obtained in the following manner. A voltage of 5 V is applied between the electrodes 11a and 11b of the flexible pattern 11 in order to generate a potential difference between the electrodes 6a and 6b. An image is drawn in the directions of

TABLE 1

|  |  | Adhesive layer | Gap 13 (μm) | Gap 12 (μm) | Characteristics | | |
| --- | --- | --- | --- | --- | --- | --- | --- |
|  |  |  |  |  | Linearity | Reliability | Cost |
| Present invention | A | Outside | 70 | 80 | ±1% | 2000 hrs. | Low |
|  | B | Outside and inside | 100 | 80 | ±1% | 3000 hrs. | Low |
| Comparative example | C | Outside and inside | 100 | 80 | ±1% | 3000 hrs. | High |
|  | D | Outside and inside | 50 | 80 | ±4% | — | High |
|  | E | Outside and inside | 100 | 80 | ±3% | — | Low |

In Table 1, analog-type transparent touch panels A and B are produced according to the present invention, and analog-type transparent touch panels C, D and E are provided as comparative examples. An analog-type transparent touch panel A is produced in a method similar to the method described with reference to FIGS. 4A through 4H, but the gap 13 is less than the gap 12. An analog-type transparent touch panel B is produced in the method shown in FIGS. 5A through 5G.

As in shown in Table 1, the analog-type transparent touch panel A has the adhesive layer 10 formed only outside the arrows 20 in FIG. 6 with a resin pen having a tip diameter of 0.6 mm at a speed of 10 mm/sec. Voltages detected while the image is being drawn are compared with a desirable voltage to find the difference between the detected voltages and the desirable voltage. The ratio of the largest difference from the detected voltages with respect to the desirable voltage is represented by percentage as the linearity of an analog-type transparent touch panel.

Reliability of an analog-type transparent touch panel is obtained in the following manner. The analog-type transparent touch panels A through E are left in an environment having a temperature of as high as 60° C. and a relative humidity of as high as 95%. The time period which is necessary for the linearity to change by 1.5% or more is obtained as the reliability of an analog-type transparent touch panel.

As is appreciated from the results, the analog-type transparent touch panels according to the present invention have the following advantages over the comparative examples:

(1) Improved linearity is shown because (a) the pair of connecting electrodes 6 for supplying power to the transparent conductive films 3a formed on the upper substrate 2, and also for connecting the transparent conductive films 3a and the take-out electrodes 4 formed on the lower substrate 1, are formed of an isotropic conductive film which is conductive both in the directions of x and y axes, not of an anisotropic film, and (b) the volumetric resistivity of each of the pair of connecting electrodes 6 is as low as $1\times10^{-2}\Omega\cdot cm$ or less.

(2) Production cost is reduced for the following reasons. (a) The power supply electrodes for both of the upper substrate 2 and the lower substrate 1 are formed only on the lower substrate 1 formed of glass and thus no electrodes are printed on the upper substrates 2 formed of PET. (b) Since the transparent conductive film 3a on the upper substrate 2 need not have guide holes, marks or the like used for positioning the electrodes and the like in a peripheral area thereof, the expensive conductive material to be sputtered to form the transparent conductive Live film 3a is effectively used with no waste. (c) Since printing is only required on the lower substrate 1, it is not necessary to prepare different equipment, space, and jigs for the different materials used for the lower (glass) substrate 1 and the upper (PET) substrate 2.

(3) Quality defect ratio is lowered. The reason is that once the transparent conductive film 3a is formed on the upper substrate 2, the upper substrate 2 does not require electrode printing, provision of a two-sided adhesive tape, or any other processing until being combined with the lower substrate 1, which protects the transparent conductive film 3a from foreign objects and substances.

As has been described so far, in an analog-type transparent touch panel, the pair of connecting electrodes 6 for supplying power to the transparent conductive films 3a formed on the upper substrate 2, and also for connecting the transparent conductive films 3a and the take-out electrodes 4 formed on the lower substrate 1, have a volumetric resistivity of about $1\times10^{-2}\Omega\cdot cm$ or less. Accordingly, the linearity of the analog-type transparent touch panel is improved. Further, since the expensive conductive material to form the transparent conductive film 3a on the upper substrate 2 is effectively used with no waste, the production cost is reduced.

Since all the elements other than one transparent conductive film can be formed on one of the upper substrate 2 and lower substrate 1, only one production method suitable to one substrate is required even if the upper substrate 2 and lower substrate 1 are formed of different materials. Thus, equipment cost is reduced. Moreover, since the number of steps for forming the power supply electrodes, the take-out electrodes 4, the insulative resist layer 9 and the like in reduced, the thin transparent conductive films are more protected from foreign objects and substances (printing board, equipment, hands of the operator, etc.). Accordingly, the quality of the analog-type transparent touch panel can be kept high with less defects.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An analog-type transparent touch panel, comprising:
   a first substrate;
   a second substrate located opposed to the first substrate with a space interposed therebetween:
   a first transparent conductive film provided on the first substrate to be opposed to the second substrate;
   a second transparent conductive film provided on the second substrate to be opposed to the first substrate;
   a pair of first electrodes for generating a potential difference in a plane of the first transparent conductive film; and
   a pair of second electrodes for generating a potential difference in a plane of the second transparent conductive film,
   wherein the pair of first electrodes are formed on the second substrate.

2. An analog-type transparent touch panel according to claim 1, wherein top parts of the pair of first electrodes are in direct contact with the first transparent conductive film.

3. An analog-type transparent touch panel according to claim 1, wherein the pair of first electrodes are formed of an isotropic conductive adhesive.

4. An analog-type transparent touch panel according to claim 1, wherein the pair of first electrodes each have a volumetric resistivity of about $1\times10^{-2}\Omega\cdot cm$ at most.

5. An analog-type transparent touch panel according to claim 1, wherein the pair of first electrodes are formed of a hot-melt resin.

6. An analog-type transparent touch panel according to claim 1, wherein the pair of first electrodes are formed of a thermosetting resin.

7. An analog-type transparent touch panel according to claim 1, wherein the first substrate and the second substrate are formed of different materials.

8. An analog-type transparent touch panel according to claim 1, wherein the second transparent conductive film is a quadrangle having four substantially 90° angles; the pair of first electrodes are located along two sides of the second transparent conductive film opposite to each other; and the pair of second electrodes are located along another two sides of the second transparent conductive film.

9. An analog-type transparent touch panel according to claim 1, further comprising an adhesive layer provided outside the pair of first electrodes for combining the first substrate and the second substrate.

10. An analog-type transparent touch panel according to claim 1, further comprising adhesive layers provided inside and outside the pair or first electrodes for combining the first substrate and the second substrate.

11. An analog-type transparent touch panel according to claim 9, wherein a gap between the first substrate and the second substrate in an area where each of the pair of first electrodes is provided is larger than a gap between the first substrate and the second substrate in an area where the adhesive layer is provided.

12. An analog-type transparent touch panel according to claim 10, wherein a gap between the first substrate and the second substrate in an area where each of the pair of first electrodes is provided is larger than a gap between the first substrate and the second substrate in an area where each of the adhesive layers is provided.

13. An analog-type transparent touch panel according to claim 1, wherein the first transparent conductive film and the second transparent conductive film are put into contact with each other by a force applied to the first substrate, to allow a position at which the first transparent conductive film and the second transparent conductive film contact each other to be detected by measuring a partial voltage of a voltage applied to the first substrate and a partial voltage of a voltage applied to the second substrate, the partial voltages corresponding to the contact position.

14. A method for producing an analog-type transparent touch panel comprising: a first substrate; a second substrate located opposed to the first substrate with a space interposed therebetween; a first transparent conductive film provided on the first substrate to be opposed to the second substrate; a second transparent conductive film provided on the second substrate to be opposed to the first substrate; a pair of first electrodes for generating a potential difference in a plane of the first transparent conductive film; and a pair of second electrodes for generating a potential difference in a plane of the second transparent conductive film, the method comprising the step of:

forming the pair of first electrodes and the pair of second electrodes on the second substrate.

15. A method according to claim 14, further comprising the step of combining the first substrate and the second substrate, whereby electrically connecting the pair of first electrodes with the first transparent conductive film by putting the pair of first electrodes into contact with the first transparent conductive film.

16. A method according to claim 15, wherein the step of combining includes the step of pressing the first substrate to the pair of first electrodes while heating at least the pair of first electrodes by a heat pressing member.

17. A method according to claim 14, further comprising the step of forming the pair of first electrodes of a hot-melt resin.

18. A method according to claim 14, further comprising the step of forming the pair of first electrodes of a thermosetting resin.

19. A method according to claim 14, further comprising the step of forming an adhesive layer for combining the first substrate and the second substrate on at least one of the first substrate and the second substrate.

* * * * *